United States Patent
Zhang et al.

(10) Patent No.: US 10,831,296 B1
(45) Date of Patent: Nov. 10, 2020

(54) TOUCH REJECTION FOR WET FABRIC

(71) Applicant: Apple Inc., Cupertino, CA (US)

(72) Inventors: Sai Zhang, Santa Clara, CA (US); Ari Y. Benbasat, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/265,863

(22) Filed: Feb. 1, 2019

Related U.S. Application Data

(60) Provisional application No. 62/729,636, filed on Sep. 11, 2018.

(51) Int. Cl.
*G06F 3/041* (2006.01)
*G06F 1/16* (2006.01)

(52) U.S. Cl.
CPC ............ *G06F 3/0412* (2013.01); *G06F 1/163* (2013.01); *G06F 1/1643* (2013.01); *G06F 3/0418* (2013.01)

(58) Field of Classification Search
CPC ...... G06F 3/0412; G06F 1/163; G06F 1/1643; G06F 3/0418
See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,663,607 B2 | 2/2010 | Hotelling et al. | |

(Continued)

FOREIGN PATENT DOCUMENTS

| | | |
|---|---|---|
| JP | 2000163031 A | 6/2000 |
| JP | 2002342033 A | 11/2002 |

OTHER PUBLICATIONS

Lee, S.K. et al. (Apr. 1985). "A Multi-Touch Three Dimensional Touch-Sensitive Tablet," Proceedings of CHI: ACM Conference on Human Factors in Computing Systems, pp. 21-25.

(Continued)

*Primary Examiner* — Charles V Hicks
(74) *Attorney, Agent, or Firm* — Kubota & Basol LLP

(57) ABSTRACT

Touch input processing for touch-sensitive devices can be used to filter unintended contact detected on a touch-sensitive surface. Moist or wet fabrics on the edge of a touch-sensitive surface can be erroneously detected as touch input and degrade touch performance. In some examples, input paths can be classified as touch paths or non-touch paths (corresponding to wet fabrics). Non-touch paths can be filtered out to avoid unintended input to a touch-sensitive device. Classifying paths can improve touch performance in environments where a wet fabric may come in contact with the edge of the touch-sensitive surface. In some examples, paths can be classified as touch paths or non-touch paths based on characteristics of edge touch nodes. In some examples, paths can be classified as touch paths or non-touch paths based on a determined state.

25 Claims, 11 Drawing Sheets

(56) References Cited

U.S. PATENT DOCUMENTS

| | | | |
|---|---|---|---|
| 8,479,122 | B2 | 7/2013 | Hotelling et al. |
| 8,581,867 | B2 | 11/2013 | Shin |
| 8,717,331 | B2 | 5/2014 | Kremin |
| 8,982,097 | B1 | 3/2015 | Kuzo |
| 2006/0197753 | A1 | 9/2006 | Hotelling |
| 2018/0011596 | A1 | 1/2018 | Korapati |
| 2018/0059872 | A1* | 3/2018 | Iida .................. G06F 3/04883 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

TOUCH REJECTION FOR WET FABRIC

CROSS-REFERENCE TO RELATED APPLICATIONS

This application claims the benefit under 35 USC 119(e) of U.S. Provisional Patent Application No. 62/729,636, filed Sep. 11, 2018 the contents of which are incorporated herein by reference in their entirety for all purposes.

FIELD OF THE DISCLOSURE

This relates generally to touch input processing for touch-sensitive devices, and more particularly, to filtering unintended contact detected on a touch sensor panel or touch screen from a wet fabric.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are popular because of their ease and versatility of operation as well as their declining price. Touch screens can include a touch sensor panel, which can be a clear panel with a touch-sensitive surface, and a display device such as a liquid crystal display (LCD), light emitting diode (LED) display or organic light emitting diode (OLED) display that can be positioned partially or fully behind the touch sensor panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch. Thereafter, the computing system can perform one or more actions based on the touch. In the case of some touch sensing systems, a physical touch on the display may not be needed to detect a touch. For example, in some capacitive-type touch sensing systems, fringing electrical fields used to detect touch can extend beyond the surface of the display, and objects approaching near the surface may be detected near the surface without actually touching the surface.

Touch sensor panels can include an array of touch sensors capable of detecting touches (the touching by an object such as a finger upon a touch-sensitive surface). Some touch sensor panels are able to detect multiple touches (e.g., the touching of multiple fingers upon a touch-sensitive surface at distinct locations at or about the same time) and near touches (e.g., fingers within the near-field detection capabilities of their touch sensors), and identify and track their locations.

In reality, however, not all touches detected on a touch sensor panel are intended user input. For example, water on the surface of the touch sensor panel can be detected as a touch. In particular, water on a touch-sensitive surface in contact with a metal housing of the device or a finger can be grounded and appear as a touch by a finger. As another example, wet materials, such as a moist or wet fabric, can be detected as a touch. As a result, water (or other unintentional touches) can result in unintended behavior by the device. Unintentional touches can negatively affect user experience, particularly in wet environments.

SUMMARY OF THE DISCLOSURE

This relates to touch input processing for touch-sensitive devices, and more particularly, to filtering unintended contact detected on a touch-sensitive surface. In wet environments in particular, water (e.g., from rain, shower, sweat, etc.) on the touch-sensitive surface can be erroneously detected as touch input and degrade touch performance. Additionally, moist or wet fabrics (e.g., a shirt or coat sleeve) on the edge of a touch-sensitive surface can be erroneously be detected as touch input and degrade touch performance. In some examples, input paths can be classified as touch paths (likely intended input) or non-touch paths (likely unintended input corresponding to a wet fabric). Non-touch paths can be filtered out to avoid unintended input to a touch-sensitive device. Classifying paths as non-touch paths in this manner can reduce processing requirements and save power by rejecting such non-touch paths corresponding to wet fabrics without requiring further processing-intensive algorithms to reject these non-touch paths. Additionally, classifying paths can improve touch performance in environments where a wet fabric (e.g., a sleeve) may come in contact with the edge of the touch-sensitive surface. In some examples, paths can be classified as touch paths or non-touch paths based on characteristics of edge touch nodes. In some examples, paths can be classified as touch paths or non-touch paths based on a determined state.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates to touch input processing for touch-sensitive devices, and more particularly, to filtering unintended contact detected on a touch-sensitive surface. In wet environments in particular, water (e.g., from rain, shower, sweat, etc.) on the touch-sensitive surface can be erroneously detected as touch input and degrade touch performance. Additionally, moist or wet fabrics (e.g., a shirt or coat sleeve) on the edge of a touch-sensitive surface (e.g., of a wearable device worn on the wrist) can be erroneously be detected as touch input and degrade touch performance. In some examples, input paths can be classified as touch paths (likely intended input) or non-touch paths (likely unintended input corresponding to a wet fabric). Non-touch paths can be filtered out to avoid unintended input to touch-sensitive devices. Classifying paths as non-touch paths in this manner can reduce processing requirements and save power by rejecting such non-touch paths corresponding to wet fabrics without requiring further processing-intensive algorithms to reject these non-touch paths. Additionally, classifying paths can improve touch performance in environments where a wet fabric (e.g., a sleeve) may come in contact with the edge of the touch-sensitive surface. In some examples, paths can be classified as touch paths or non-touch paths based on characteristics of edge touch nodes. In some examples, paths can be classified as touch paths or non-touch paths based on a determined state.

Figure 1:
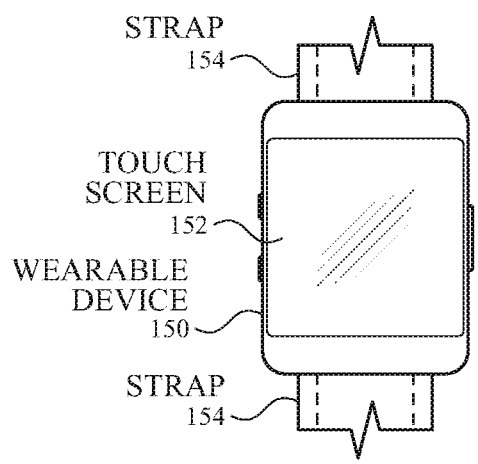
FIG. 1 illustrates an exemplary system with a touch screen that can perform input processing according to examples of the disclosure.

FIG. 1 illustrates an exemplary system with a touch screen that can perform input processing according to examples of the disclosure. For example, FIG. 1 illustrates an example wearable device 150 (e.g., a watch) that includes a touch screen 152 and can perform input processing according to examples of the disclosure. For example, the input processing herein can be used to reject inadvertent touches from wet or moist fabric (e.g., a wet sleeve, a wet pocket). Wearable device 150 can be coupled to a user (e.g., the wrist) via strap 154 or any other suitable fastener. It should be understood that the example wearable device illustrated in FIG. 1 is provided by way of example, and other types of wearable and non-wearable devices (e.g., mobile phone, digital media player, personal computer, tablet computing device, etc.) can perform input processing according to examples of the disclosure to reject touches from wet fabrics (e.g., based on edge touch nodes, based on state). Additionally, although the device illustrated in FIG. 1 includes a touch screen, in some examples, input processing according to examples of the disclosure can be performed for touch sensor panels without a display (e.g., on a track pad of a laptop computing device). In some examples, touch screen 152 can be based on self-capacitance or mutual capacitance. In some examples, a touch screen can be multi-touch, single touch, projection scan, full-imaging multi-touch, capacitive touch, etc.

Figure 2:
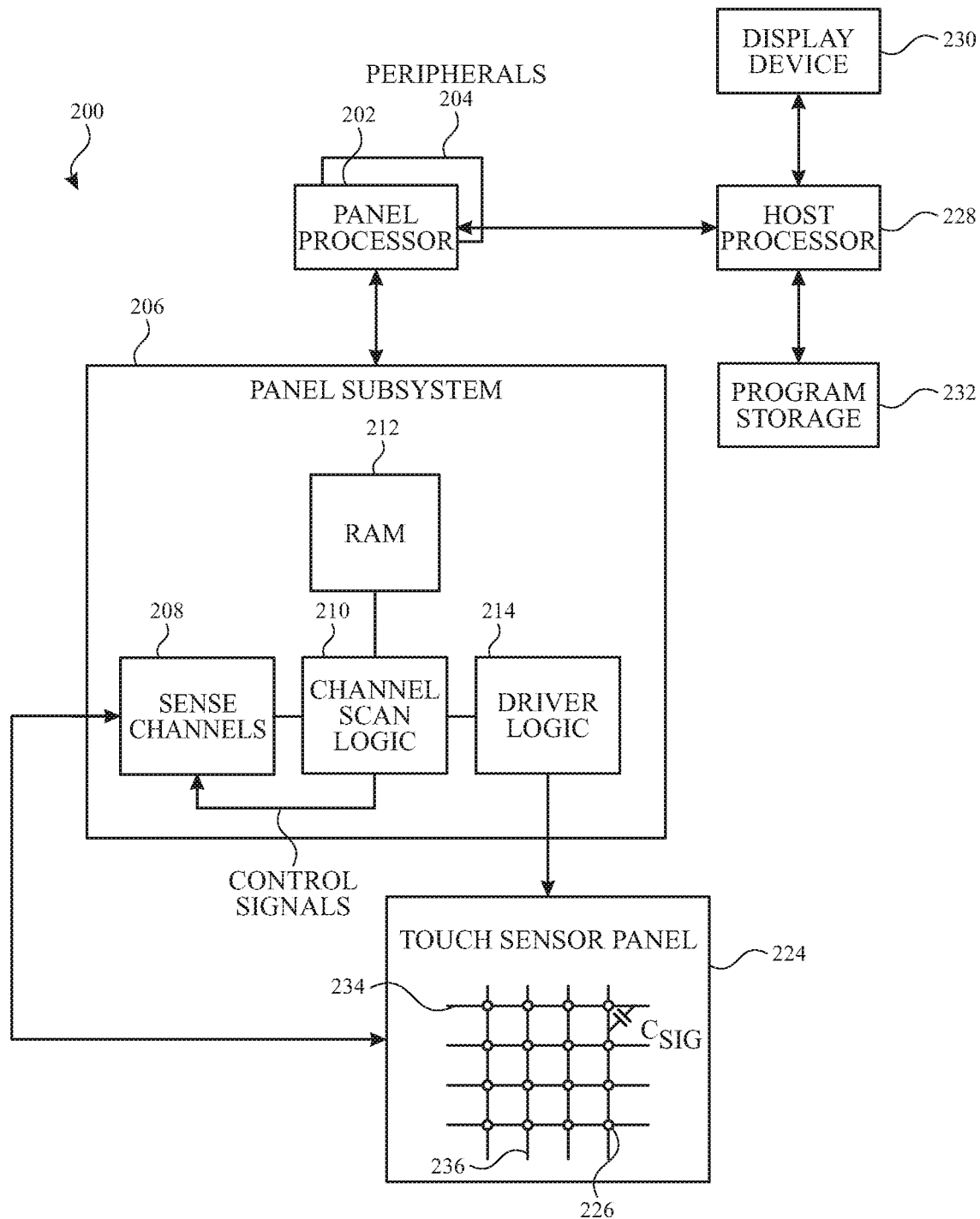
FIG. 2 illustrates an exemplary computing system including a capacitive touch sensor panel that can perform input processing according to examples of the disclosure.

FIG. 2 illustrates an exemplary computing system 200 including a capacitive touch sensor panel 224 that can perform input processing according to examples of the disclosure. Computing system 200 can be included in, for example, wearable device 150, or any mobile or non-mobile computing device that includes a touch sensor panel or touch screen. Computing system 200 can include a touch sensing system including one or more panel processors 202, peripherals 204, and panel subsystem 206. Peripherals 204 can include, but are not limited to, random access memory (RAM) or other types of memory or storage, watchdog timers and the like. Panel subsystem 206 can include, but is not limited to, one or more sense channels 208, channel scan logic (analog or digital) 210 and driver logic (analog or digital) 214. Touch sensor panel 224 can include row electrodes 234 and column electrodes 236. In mutual capacitance touch sensor panel examples, stimulation signals from driver logic 214 can be driven onto row electrodes 234, and sense signals on column electrodes 236 can be sensed by sense channels 208 (also referred to as sense circuitry). Touch or proximity events can alter the capacitive coupling Csig between row electrodes 234 and column electrodes 236 at touch nodes 226 and cause a change to the sense signals on column electrodes 236. However, in self-capacitance touch sensor panel examples, driver logic 214 and sense channels 208 can be combined, and the touch sensor panel can be driven and sensed on both row electrodes 234 and column electrodes 236. Channel scan logic 210 can access RAM 212, autonomously read data from sense channels 208 and provide control for the sense channels. In addition, channel scan logic 210 can control driver logic 214 to generate stimulation signals that can be sequentially or simultaneously applied to the row electrodes 234 of touch sensor panel 224. Panel processor 202 can process the data received from scanning the touch sensor panel. In some examples, panel subsystem 206, panel processor 202 and peripherals 204 can be integrated into a single application specific integrated circuit (ASIC) that can be referred to herein as a touch controller.

In mutual capacitance sensing examples, touch sensor panel 224 can include a capacitive sensing medium having one or more drive electrodes and one or more sense electrodes. The drive and sense electrodes can be formed from a partially or fully transparent conductive medium such as Indium Tin Oxide (ITO) or Antimony Tin Oxide (ATO), although other partially or fully transparent and non-transparent materials such as copper can also be used. In some examples, the drive and sense electrodes can be formed from other materials including conductive polymers, metal mesh, graphene, nanowires (e.g., silver nanowires) or nanotubes (e.g., carbon nanotubes). The drive and sense electrodes can be formed on a single side of a transparent substrate. Each adjacency of drive and sense electrodes can represent a capacitive sensing node and can be viewed as touch picture element (touch pixel) or touch node 226, which can be particularly useful when touch sensor panel 224 is viewed as capturing an "image" of touch or proximity. (In other words, after panel subsystem 206 has determined whether a touch or proximity event has been detected at each sense electrode in the touch sensor panel, the pattern of sense electrodes in the touch sensor panel at which a touch or proximity event occurred can be viewed as an "image" of touch or proximity (e.g., a pattern of fingers touching the panel or proximate to, but not touching, the panel).) The capacitance between the drive and sense electrodes and local system ground can appear as a stray capacitance Cstray, and the capacitance at the intersections of the drive and sense electrodes, i.e., the touch nodes, can appear as a mutual signal capacitance Csig between the drive and sense electrodes when the given drive electrode is stimulated with an alternating current (AC) signal. The presence of a finger or other object (such as a stylus) near or on the touch sensor panel can be detected by measuring changes (e.g., decreases) to a signal charge present at the nodes being touched, which can be a function of Csig. Each drive electrode of touch sensor panel 224 can be coupled to driver logic 214 in panel subsystem 206. Each sense electrode of touch sensor panel 224 can be coupled to a sense channel 208 in panel subsystem 206. As used herein, an electrical component "coupled to" or "connected to" another electrical component encompasses a direct or indirect connection providing electrical path for communication or operation between the coupled components. Thus, for example, some electrodes (e.g., column electrodes 236 of touch sensor panel 224) may be directly connected to sense channels or indirectly connected to sense channels (e.g., via switching circuitry) and some electrodes (e.g., row electrodes 234 of touch sensor panel 224) may be directly connected to driver logic or indirectly connected to driver logic, but in either case an electrical path can be provide for driving or sensing the touch electrodes. Touch sensor panel 224 can cover a portion or all of a surface of a device.

In some self-capacitance sensing examples, the touch sensor panel 224 can include a matrix of small plates of conductive material that can be referred to as a touch pixel, touch node, or a touch pixel electrode. The touch nodes can be formed from a partially or fully transparent conductive medium such as ITO or ATO, although other partially or fully transparent and non-transparent materials such as copper can also be used. In some examples, the conductive plates can be formed from other materials including conductive polymers, metal mesh, graphene, nanowires (e.g., silver nanowires) or nanotubes (e.g., carbon nanotubes). The touch nodes can be formed on a single side of a transparent substrate. In some examples, a touch screen can include a plurality of individual touch nodes, each touch node identifying or representing a unique location on the touch screen at which touch or proximity (i.e., a touch or proximity event) is to be sensed, and each touch node being electrically isolated from the other touch nodes in the touch screen/panel. Such a touch screen can be referred to as a pixelated touch screen. During self-capacitance operation of the pixelated touch screen, a touch node can be stimulated with an AC waveform, and the self-capacitance to ground of the touch node can be measured. As an object approaches the touch node, the self-capacitance to ground of the touch node can change (e.g., decrease). This change in the self-capacitance of the touch node can be detected and measured by the touch sensing system to determine the positions of multiple objects when they touch, or come in proximity to, the touch sensor panel. Each touch node of touch sensor panel 224 can be coupled to a sense channel 208 in panel subsystem 206. Touch sensor panel 224 can cover a portion or all of a surface of a device.

In some examples, the electrodes of a mutual-capacitance based touch system can be formed from a matrix of small, individual plates of conductive material, and changes in the mutual capacitance between plates of conductive material can be detected, similar to above. In some examples, the electrodes of a self-capacitance based touch system can be formed from rows and columns of conductive material, and changes in the self-capacitance to ground of the rows and columns can be detected. In some examples, the touch screen 152 can be based on mutual capacitance and/or self-capacitance. The electrodes can be arrange as a matrix of small, individual plates of conductive material (e.g., as illustrated in FIG. 5B) or as drive lines and sense lines (e.g., as in touch sensor panel 224 in FIG. 2 or in touch screen 300 in FIG. 3), or in another pattern. The electrodes can be configurable for mutual capacitance or self-capacitance sensing or a combination of mutual and self-capacitance sensing. For example, in one mode of operation electrodes can be configured to sense mutual capacitance between electrodes and in a different mode of operation electrodes can be configured to sense self-capacitance of electrodes. In some examples, some of the electrodes can be configured to sense mutual capacitance therebetween and some of the electrodes can be configured to sense self-capacitance thereof.

Computing system 200 can also include host processor 228 for receiving outputs from panel processor 202 and performing actions based on the outputs that can include, but are not limited to, moving one or more objects such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to panel processing, and can be coupled to program storage 232 and display device 230 such as an LCD display (or an LED display or an OLED display) for providing a UI to a user of the device. Display device 230 together with touch sensor panel 224, when partially or entirely overlapping with the touch sensor panel, can form a touch screen.

In some examples, touch sensor panel 224 and display device 230 together can form an integrated touch screen in which touch nodes of the touch sensing system can be integrated into the display pixel stack-ups of display device 230. The circuit elements in an integrated touch screen can include, for example, elements that can exist in LCD or other displays (LED display, OLED display, etc.), such as one or more display pixel transistors (e.g., thin film transistors (TFTs)), gate lines, data lines, pixel electrodes and common electrodes. It is noted that circuit elements are not limited to whole circuit components, such as a whole capacitor, a whole transistor, etc., but can include portions of circuitry, such as only one of the two plates of a parallel plate capacitor. In some configurations, each common electrode in an integrated touch screen can serve as a multi-function circuit element that can operate as display circuitry of the display system of the touch screen and can also operate as touch nodes of the touch sensing system. Specifically, each common electrode can operate as a common electrode of the display circuitry of the touch screen (e.g., during a display phase), and can also operate as a common electrode (i.e., a touch node) of the touch sensing system of the touch screen (e.g., during a touch sensing phase). It should be understood that a display phase and a touch sensing phase of an integrated touch screen may be operated at the same time, e.g., partially or completely overlapping, or the display phase and touch sensing phase may operate at different times.

In general, each of the touch nodes may be either a multi-function circuit element that can form part of the touch sensing system and can perform one or more other functions, such as forming part of the display circuitry, or may be a single-function circuit element that can operate as a touch node only. Similarly, each of the display circuit elements may be either a multi-function circuit element that can operate as display circuitry and perform one or more other functions, such as operating as a touch node, or may be a single-function circuit element that can operate as display circuitry only. Therefore, in some examples, some of the circuit elements in the display pixel stack-ups can be multi-function circuit elements and other circuit elements may be single-function circuit elements. In other examples, all of the circuit elements of the display pixel stack-ups may be single-function circuit elements.

Note that one or more of the functions described herein, including the processing of inputs according to examples of the disclosure, can be performed by firmware stored in memory (e.g., one of the peripherals 204 in FIG. 2) and executed by panel processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable medium storage can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Figure 3:
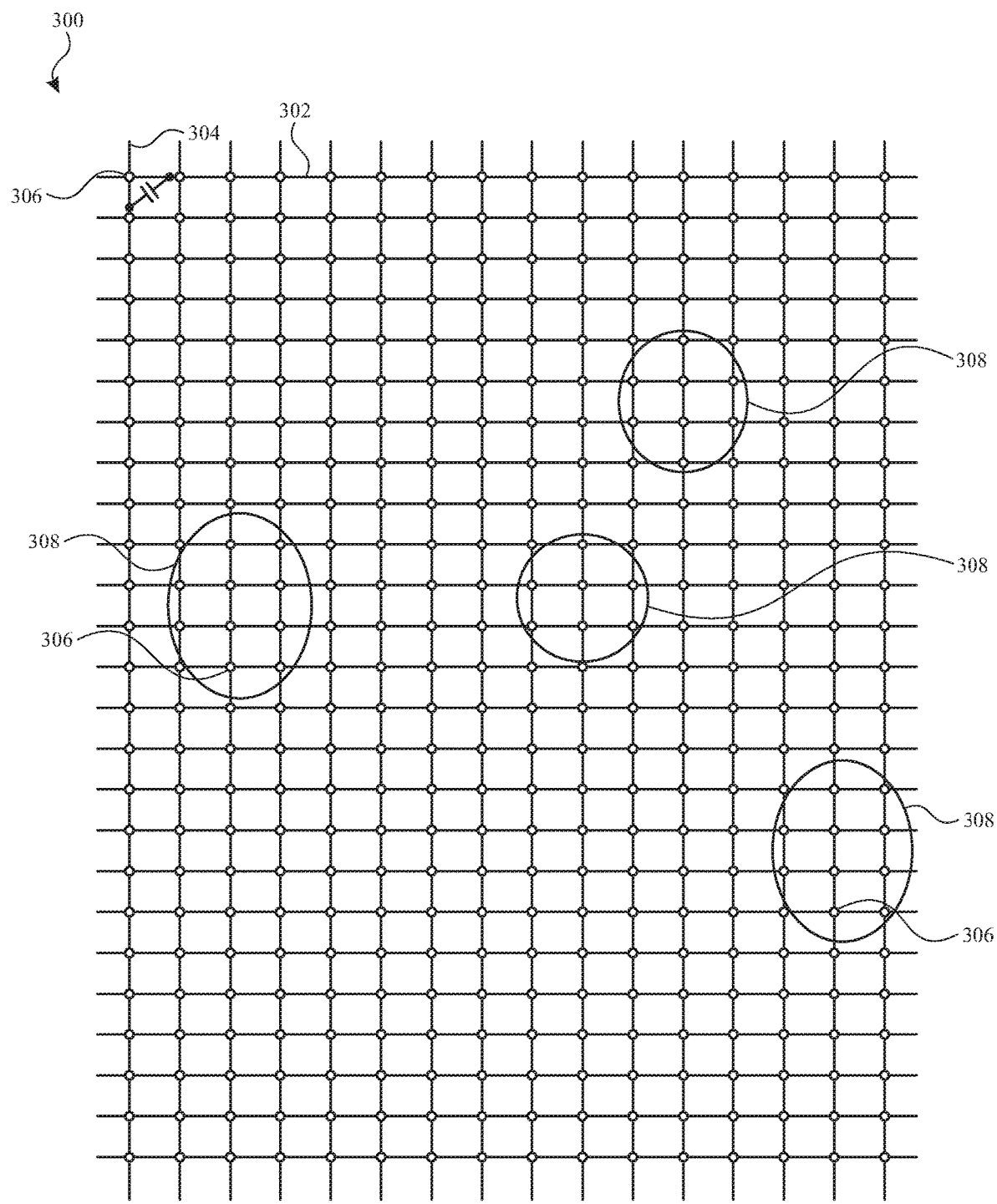
FIG. 3 illustrates an exemplary representation of an image of touch according to examples of the disclosure.

As discussed above, capacitive measurements (touch signals or data) at the touch nodes of touch sensor panel 224 can be viewed as an image of the touch (or touch image) when processed by panel processor 202 and/or host processor 228. FIG. 3 illustrates an exemplary representation of an image of touch according to examples of the disclosure. Touch screen 300 can include drive lines 302 and sense lines 304 arranged as a pattern of rows and columns, although other patterns can be possible. Touch nodes 306 can be formed at the intersection between drive lines 302 and sense lines 304, and the mutual capacitance (or change in mutual capacitance) therebetween can be measured. Each object touching or proximate to, but not touching, the touch screen 300 can produce a touch signal at proximate touch nodes 306. By processing the touch image, touch signals from proximate touch nodes 306 (e.g., those touch signals meeting a threshold signal level) can be grouped together to form input patches 308. Thus, the input patches 308 can be regions within the image of touch corresponding to touch nodes 306 having signal values produced by an object touching (or proximate to, but not touching, in some examples) the touch screen 300. The input patches identified in a touch image can be tracked through multiple successive touch images. Input patches from a corresponding object captured across multiple touch images can be assigned to a corresponding path. Assigning input patches to paths can allow for tracking gesture inputs (e.g., swipe, pinch, etc.). In some examples, the path can track the input contact from an initial touchdown on the touch-sensitive surface through a liftoff from the touch-sensitive surface. In some examples, the input patches of a path can be analyzed to identify movement of the input patch across one or more touch images and thereby track movement of an object corresponding to the input patches. Although a path can be used to identify movement, some paths may not include movement (e.g., when the input patch remains in the same position from touchdown to liftoff, such as in a tap). The tracking can include tracking position, velocities, and/or geometries (e.g., shape, number of touch nodes) of the input patches from various touch images corresponding to a path.

Various characteristics can be computed for each input patch in the touch image that can be used for further processing. For example, each input patch can be characterized by total signal, peak signal, position, shape, size and/or orientation. In some examples, each input patch can be represented by an ellipse defined by a centroid (location of touch), major and minor axis lengths and/or a major axis orientation. In some examples, the number of touch nodes, peak signal, total signal and/or signal density for each input patch can be computed. Additionally, in some examples, the centroid, major and minor axis lengths and/or major (or minor) axis orientation can be computed. In some examples, the number of touch nodes, peak signal and/or peak signal density can be tracked for each path across multiple touch images. Additionally, in some examples, the centroid, major and minor axis lengths and/or major (or minor) axis orientation can be tracked for each path across multiple touch images, where the tracked centroid can represent the trajectory of the object corresponding to the path.

For example, the number of touch nodes in an input patch can be calculated by counting the number of touch nodes with the threshold signal level included in the input patch. The peak signal can, for example, be calculated by taking the maximum signal measured at the touch nodes included in the input patch. An input patch's total signal can, for example, be calculated by summing the square of the signal value at each touch node in the input patch. Thus, total signal for an input patch can be expressed mathematically as in Equation (1):

$$Z_P = \sum_{i,j \in P} [V_{[i][j]}^2] \qquad (1)$$

where $Z_P$ can represent the total signal for an input patch, V can represent the signal value at a touch node and i, j can represent the row and column coordinate of each touch node. In some examples, the signal value at each touch node can be calibrated (e.g., normalized) before computing the total signal.

An input patch's signal density can be computed based on the input patch's total signal. In some examples, an input patch's signal density can be calculated by dividing the total signal for an input patch by the geometric mean radius of the input patch. In other examples, the input patch's signal density can be calculated by dividing the total signal for an input patch by the number of touch nodes in the input patch. Thus, signal density for an input patch can be expressed mathematically, for example, as in Equations (2) or (3):

$$Z_{density,P} = \frac{Z_P}{\text{geometric mean radius of } P} \quad (2)$$

$$Z_{density,P} = \frac{Z_P}{\text{number of touch nodes forming } P} \quad (3)$$

Aside from identifying and parameterizing input patches, processing of the touch image can be used to calculate other parameters of the touch image. Some or all of these additional parameters can be used in rejecting unintended touch input from wet materials. For example, as described herein, the touch image can be processed to determine a maximum signal for the image of touch (e.g., rather than the peak signal for a specific identified input patch or path), to determine a number of qualifying touch nodes in the touch image (e.g., those touch signals meeting a threshold signal level, which may be different (lower) than the threshold signal level for grouping together proximate touch nodes), to determine a number of qualifying edge touch nodes (edge touch nodes meeting a threshold signal level as described with reference to FIG. 8 or 10), and a gradient of outer edge touch nodes and inner edge touch nodes (difference between a sum of outer edge touch nodes and a sum of inner edge touch nodes as described with reference to FIG. 8).

These touch image parameters can be tracked across multiple images such that a maximum signal, a maximum number of qualifying outer edge touch nodes, a maximum number of qualifying touch nodes, and a minimum gradient of the outer edge touch nodes and inner edge touch nodes can be determined for the multiple touch images. In some examples, the touch image parameters can be tracked for each path. In such examples, the maximum or minimum of the tracked touch image parameters can consider touch images including an input patch of the path, and exclude touch images that do not include an input patch assigned to the path. In some examples, these touch image parameters can be tracked on a regional basis. For example, a first region of the touch image (e.g., a left half) can be processed separately from a second region of the touch image (e.g., a right half). Additional details regarding these touch image parameters are described herein, for example, with respect to FIGS. 7 and 9.

In some examples of the disclosure, paths can be classified based on information including touch image parameters, path parameters and/or state. Classifying paths can improve efficiency by excluding paths that are likely not intended touch input before applying computation-intensive touch processing algorithms that may be used to reject unintended paths and/or determine the touch input for the computing system corresponding to the one or more detected paths. Excluding paths without the subsequent further processing can reduce processing requirements of, and thereby reduce power consumption by, the touch sensing system. Additionally, eliminating likely non-touch paths before further processing can avoid false positives when the further processing algorithms fail to differentiate between intended and non-intended touches.

Figure 4:
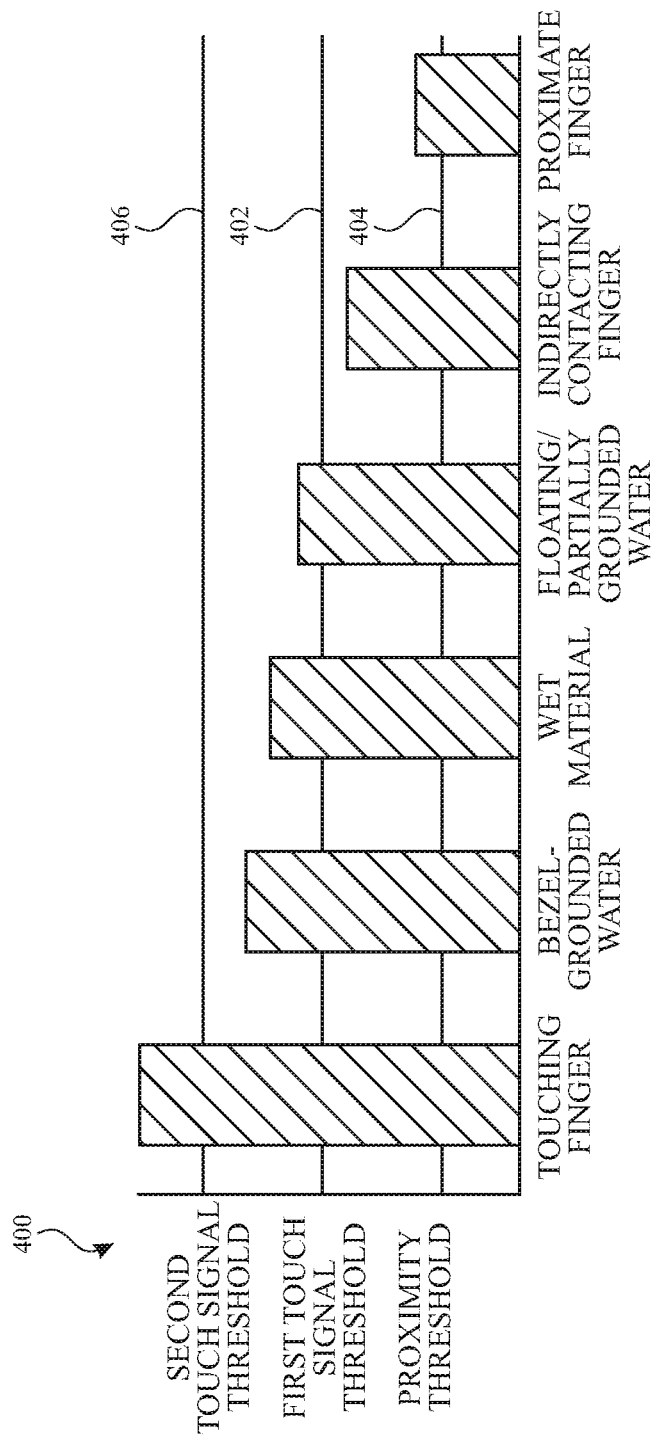
FIG. 4 illustrates an exemplary plot of touch signal thresholds corresponding to different objects proximate to or touching a touch-sensitive surface according to examples of the disclosure.

FIG. 4 illustrates an exemplary plot 400 of touch signal thresholds corresponding to different objects proximate to or touching a touch-sensitive surface according to examples of the disclosure. FIG. 4 illustrates example peak signals for an input patch corresponding to a finger proximate to, but not in contact with, a touch-sensitive surface, a finger indirectly contacting the touch-sensitive surface (e.g., via a glove or bandage), a finger in contact with a touch-sensitive surface, a floating or partially grounded water drop (or other liquid), a wet material, and a bezel-grounded water drop (or other liquid). It should be understood that these are representative peak signal measurements for input patches, and that a range of peak signal values are possible for these objects. For example, an indirectly contacting finger may have a peak signal larger than a floating water drop when the separation between the indirectly contacting finger and the touch-sensitive surface is within a threshold distance of the screen (e.g., <1 mm). Among the represented objects in FIG. 4, peak signal for an input patch can be greatest for a finger in contact with a touch-sensitive surface and least for a fingering proximate to, but not in contact with, the touch sensitive surface. Peak signal for an input patch corresponding to a bezel-grounded water drop can be less than for an input patch corresponding to a finger in contact with the touch-sensitive surface, but greater than for an input patch corresponding to a floating or partially grounded water drop. Peak signal for an input patch corresponding to a floating or partially-grounded water drop can be less than for an input patch corresponding to a bezel-grounded water drop, but greater than for an input patch corresponding to an indirectly contacting finger or a proximate, non-contacting finger. Peak signal for an input patch corresponding to a wet material can be less than for an input patch corresponding to a touching finger, but greater than for an indirectly contacting finger, or a proximate, non-contacting finger.

In some touch sensing systems, a first touch signal threshold 402 can be defined to differentiate between input patches corresponding to touches and non-touches. In some examples, this first touch signal threshold can be used to identify input patches in a touch image. For example, the peak signal corresponding to a finger in contact with a touch sensitive surface can meet the first touch signal threshold 402, but the peak signal corresponding to a proximate, non-contacting finger can fail to meet the first touch signal threshold 402. The peak signal corresponding to a water drop (grounded or floating) or a wet material, however, can also meet the first touch signal threshold. Raising the threshold from the first touch signal threshold 402 to a second touch signal threshold 406 can better reject input patches corresponding to water or a wet material, but can cause the touch sensing system to miss actual finger touches (increasing false negatives). In some examples, as described in more detail below, an unintended contact by a wet material can be identified based on characteristics of the touch image and/or based on a state characteristic, to reject a path corresponding to the wet material (or to forgo further processing the path as touch).

In some touch sensing systems, a proximity threshold 404 can be defined to identify input patches corresponding to objects proximate to, but not in contact with, the touch sensitive surface. In some examples, these proximate, non-contacting patches can be used to wake up the device or otherwise prepare for touch input. Additionally, in some touch sensing systems, indirectly contacting fingers or objects can be detected using a dynamically adjustable touch signal threshold or using other conditions as described in U.S. Pat. No. 9,690,417 to Ari Y. BENBASAT, the disclosure of which is herein incorporated by reference in its entirety for all intended purposes.

Figure 5A:
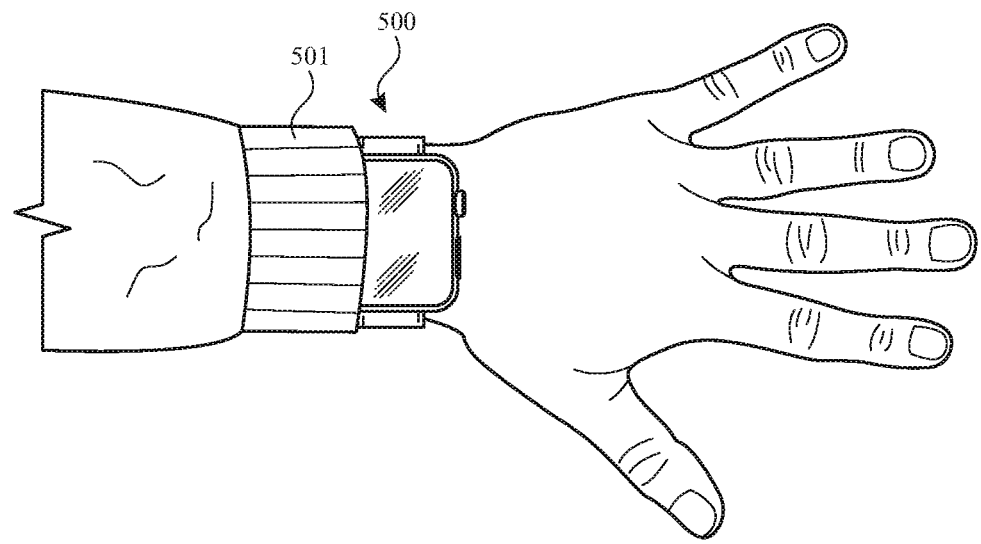
FIGS. 5A-5B illustrate an exemplary representation of an input patch corresponding to a wet material contacting an edge of a touch-sensitive surface according to examples of the disclosure.
Figure 5B:
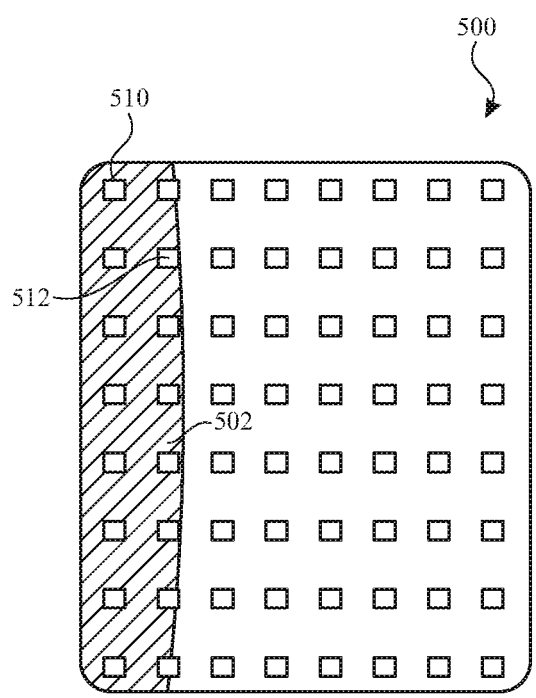

FIGS. 5A and 5B illustrate an exemplary representation of an input patch corresponding to a wet material contacting an edge of a touch-sensitive surface according to examples of the disclosure. As described herein, characteristics of such input patches can be used to reject and forgo processing inadvertent contacts due to a wet material. As illustrated in FIG. 5A, a wearable device 500 (e.g., a watch) on a user's wrist may inadvertently be contacted by a clothing sleeve 501. In some examples, the clothing sleeve can be a shirt, coat or other material. When moist or wet, sleeve 501 can cause changes in capacitance at touch nodes 510 of the touch-sensitive surface of device 500, which can be identified as input patch 502, as shown in FIG. 5B. For example, input patch 502 can be generated unintentionally by a wet athletic shirt during running, jogging or other activity. In some examples, the moist or wet sleeve 501 can be grounded (at least partially) by contacting a conductive bezel of the touch-sensitive device. As a result of bezel-grounding and/or the moisture/wetness, input patch 502 may be detected and identified as a touch by a conventional touch-sensing system. As a result, input patch 502 may cause unintended input to the device. In some examples, a similar type of input patch can be generated unintentionally on the opposite side of the touch-sensitive surface of device 500 when a user wearing device 500 places their hand in a pocket and the fabric of the pocket is moist or wet. In some examples, a similar type of input patch can be generated on one or more edges of a touch-sensitive track pad of a laptop computer by a user typing on a keyboard located proximate to the keyboard with wet sleeves.

In some examples, an input patch along one or more edges of a touch-sensitive surface can be identified as a touch path or non-touch path (unintended touch path from a wet material) based on one or more characteristics of one or more edge touch nodes corresponding to the input patch. In some examples, additional characteristics of such touches can be used to identify the input patch as unintended. An edge touch node can be defined as a touch node within a threshold distance from an edge of the touch sensitive surface. For example, as illustrated in FIG. 5B, touch-sensitive surface of device 500 can include an array of touch nodes. In some examples, the threshold distance can be such that only touch nodes 510, which are immediately adjacent to an edge of the touch-sensitive surface of device 500, can be included as edge touch nodes. In some examples, the threshold distance can be such that touch nodes 512, which are not immediately adjacent with the edge of the touch-sensitive surface of device 500, can be included as edge touch nodes as well. Additionally, in some examples, outer edge touch nodes may refer to edge touch nodes within a first threshold distance from an edge of the touch sensitive surface, and inner edge touch nodes may refer to edge touch nodes within outside the first threshold distance but within a second threshold distance from an edge of the touch sensitive surface (e.g., as described with reference to FIG. 8). In some examples, the edge touch nodes can be limited to touch nodes within a threshold distance of two edges (right, left) of the touch-sensitive surface (e.g., as described with reference to FIG. 10).

Figure 6:
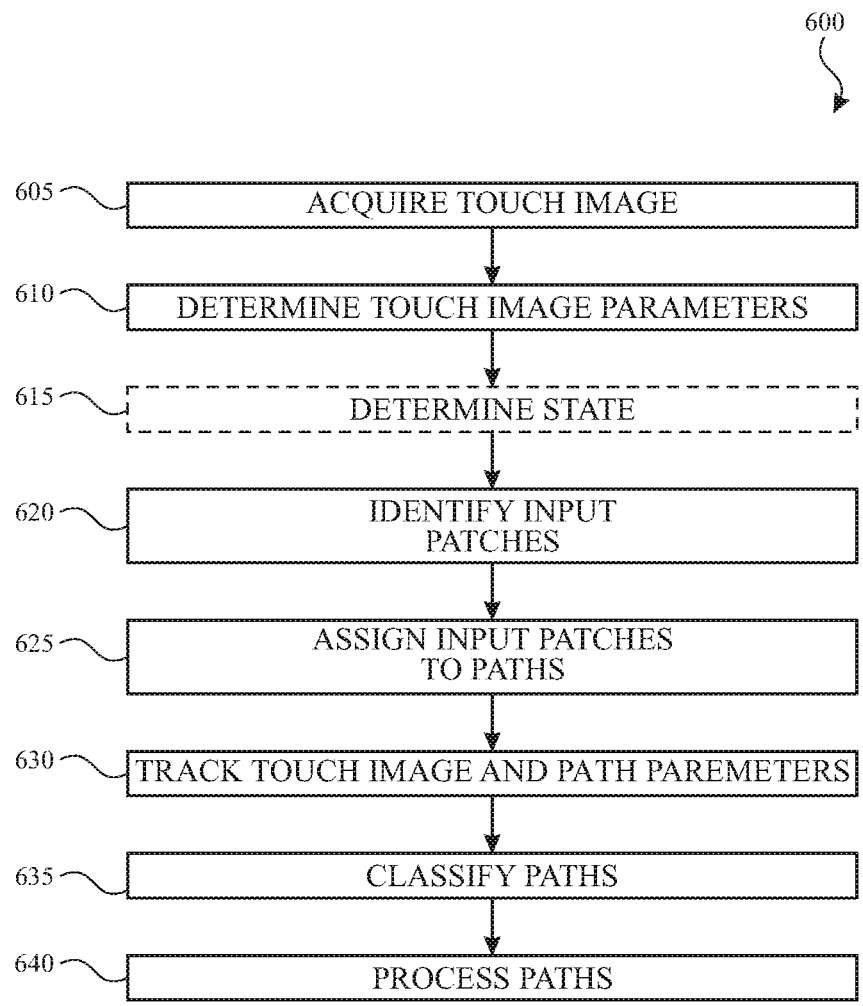
FIG. 6 illustrates an exemplary process for processing input to a touch-sensitive surface according to examples of the disclosure.

FIG. 6 illustrates an exemplary process 600 for processing input to a touch-sensitive surface according to examples of the disclosure. At 605, a touch image can be acquired. For example, signals can be measured by performing a mutual capacitance or self-capacitance scan of touch nodes of the touch screen or touch sensor panel of exemplary systems (e.g., illustrated in FIG. 1). The touch image can be formed from the signals measured during the scan. In some examples, the signals can be arranged in a two-dimensional image such that the x-coordinate and y-coordinate of the touch image corresponds to the x-coordinate and y-coordinate of the touch node. At 610, the touch image can be processed to determine touch image parameters. The touch image parameters can include, in some examples, a maximum signal for the image of touch, a number of qualifying touch nodes in the touch image (e.g., those touch signals meeting a threshold signal level), a number of qualifying edge touch nodes (e.g., those edge touch nodes with touch signals meeting a threshold signal level), and a gradient of outer edge touch nodes and inner edge touch nodes. In some examples, at 615, a state can be determined based on some of the touch image parameters. For example, a second state can be determined for a touch image meeting one or more first criteria (e.g., a qualifying edge condition) and a first state can be determined for a touch image failing to meet the one or more criteria (e.g., without the qualifying edge condition). The first state can correspond to a "normal" state not indicative of a wet material and the second state can correspond to a "wet material" state indicative of a wet material at an edge of the touch sensitive device. Additional detail of the state determination is described with reference to FIG. 9. At 620, input patches can be identified in the touch image. In some examples, the input patches can be identified using an image segmentation process. The image segmentation process can include image filtering (e.g., subtracting a baseline from the touch image and/or spatial-smoothing using a two-dimensional diffusion operator or Gaussian kernel) and segmenting the filtered touch image into input patches (groups of proximate touch nodes) corresponding to the distinguishable objects (e.g., fingers or other hand parts, styli, etc.). The touch nodes in the input patches can include a local maximum signal and proximate signals which meet a signal threshold (e.g., one of the signal thresholds illustrated in FIG. 4). Some parameters of the input patches can be determined for identified input patches. In some examples, the parameters can include signal measurements for the touch nodes of the input patches (e.g., peak signal), the number of touch nodes of the input patches, and/or signal density of the input patches.

At 625, input patches can be assigned to paths. As described herein, a path can be used to track input patches corresponding to an object across multiple touch images. For example, when an input patch corresponding to a previously detected and tracked object is detected in a touch image, the input patch can be assigned to an existing path tracking the object. When an input patch is detected that does not correspond to a previously detected and tracked object (e.g., touchdown condition), a new path can be created. When no input patch is detected in a touch image that corresponds to a previously existing path (e.g., liftoff condition), the path can be subsequently deleted (e.g., after processing touch input associated with the path). It should be understood that the touch sensing system of a touch-sensitive device determines whether an input patch belongs to a previously existing path or to a new path based on the inputs on the touch sensor. As a result, in some instances an input patch from the same object may be assigned to a new path or an input patch from a different object may be assigned to a previously existing path based on a mistaken determination by the touch sensing system. A well designed touch sensing system can, however, reduce the number of false positives/negatives in determining whether or not to assign an input patch to a new or previously existing path.

At 630, the touch image parameters and path parameters can be tracked. For example, the touch image parameters determined at 610 for each touch image including an input patch corresponding to a respective path can be tracked. For example, a maximum signal of the touch image can be tracked across multiple touch images. The path can track a maximum signal across the touch images for the path by taking the maximum of the maximum signal measurements for each touch image of the path. The path can also track a maximum number of qualifying outer edge touch nodes by taking a maximum of the number of qualifying outer edge touch nodes for each touch image of the path. Likewise, the path can track a maximum number of qualifying touch nodes by taking a maximum of the number of qualifying touch nodes for each touch image of the path, and can track a minimum gradient of the outer edge touch nodes and inner edge touch nodes by taking a minimum of the gradient for each touch image of the path. As described herein, some of these parameters can be tracked for different regions of the touch image. The path parameters can include a peak signal or a peak signal density of the path. In some examples, the state can be tracked for the touch images corresponding to the path.

At 635, paths can be classified. The classification can classify paths as corresponding to likely intended/actual touches (also referred to herein as "valid touches" or "touch paths") or as corresponding to likely unintended touches by a wet material (also referred to herein as "invalid touches" or "non-touch paths"). In some examples, the classification can be made at the conclusion of a path (e.g., at liftoff of an object corresponding to the path). In some examples, the classification can be made prior to the conclusion of the path (e.g., after a threshold period of time for the existence of the path). In some examples, the classification can be based on the tracked touch image parameters and/or based on a tracked state. At 640, paths classified as touch paths can be further processed to determine touch input for the computing system. In some examples, the further processing can include algorithms to compensate for ungrounded and/or poorly grounded objects, to compensate for negative touch pixel effects, to reject contacts from liquids (e.g., water), and/or to detect gestures. Paths classified as non-touch paths (and/or proximity paths) can be excluded from the further processing, in some examples. By forgoing this further processing, the touch sensing system can reduce processing requirements (and power consumption) and avoid executing unintended action based unintended touch input from a wet material.

In some examples, classifying paths at 635 can include one or more classifiers. For example, a first classifier can be based on tracked touch image parameters (e.g., as described below with reference to FIG. 7) and a second classifier can be based on a tracked state (e.g., as described below with reference to FIG. 9). In some examples, the processing of the two classifiers can be serial (e.g., second classifier follows the first classifier), and the processing of the second of the two classifiers can be omitted for a path when the first classifier indicates the path is a non-touch path (e.g., corresponding to a wet material). In some examples, the two classifiers can be performed in parallel. In some examples, the first and second classifier can be complimentary, with the second classifier optimized to reject paths due to wet materials that may not be rejected by the first classifier (e.g., because the wet material contacts only the one edge touch nodes).

Figure 7:
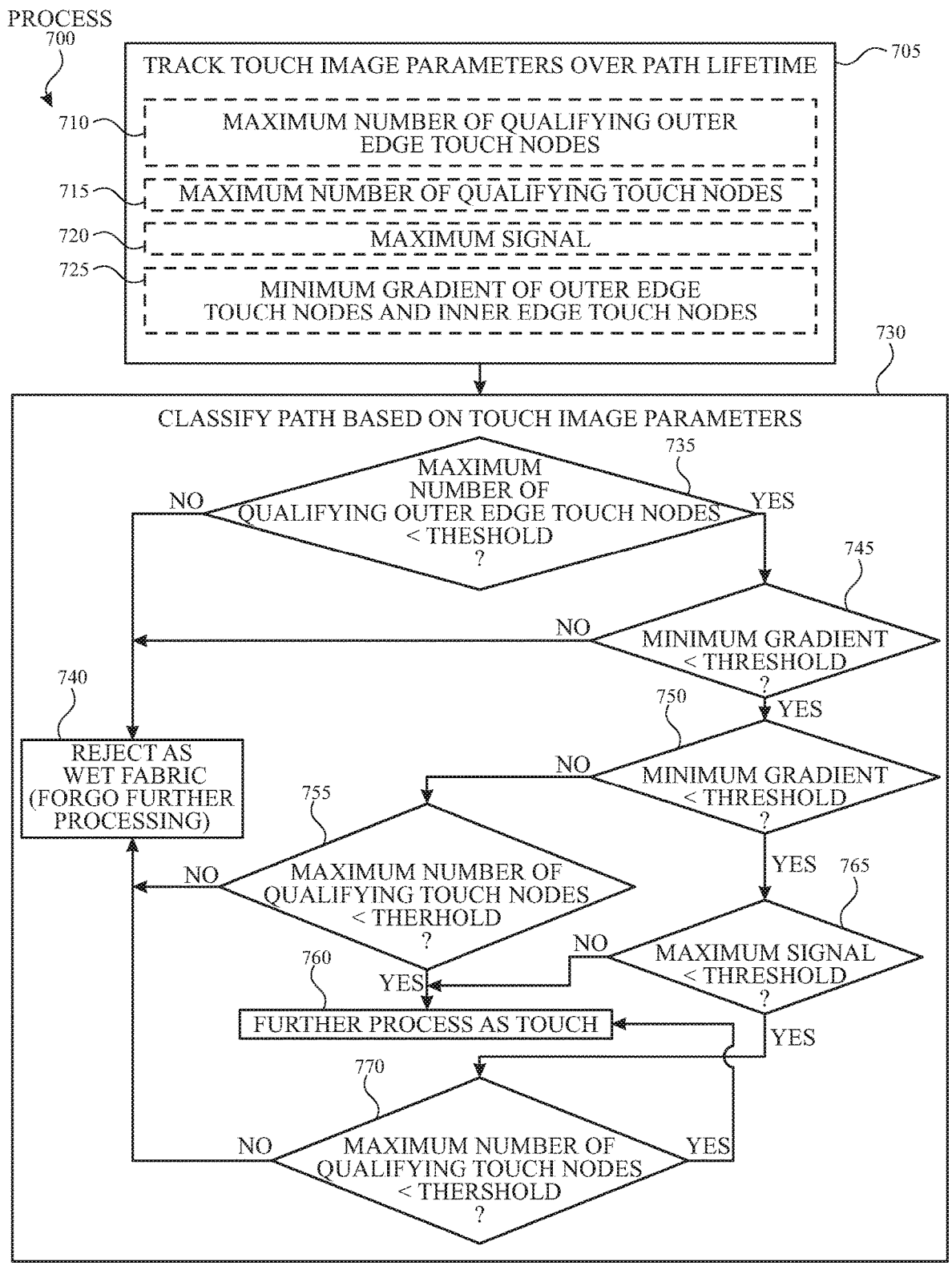
FIG. 7 illustrates an exemplary process for classifying paths based on based on tracked touch image parameters according to examples of the disclosure.

FIG. 7 illustrates an exemplary process 700 for classifying paths based on based on tracked touch image parameters according to examples of the disclosure. At 705, touch image parameters can be tracked over a path lifetime (e.g., from an input patch corresponding to touch down of an object and until lift off of the object). The touch image parameters can include a maximum number of qualifying outer edge touch nodes across the touch images over the path lifetime (710), a maximum number of qualifying touch nodes across the touch images over the path lifetime (715), a maximum signal across the touch images over the lifetime of the path (720), and a minimum gradient of the outer edge touch nodes and inner edge touch nodes across touch images over the lifetime of the path (725).

Figure 8:
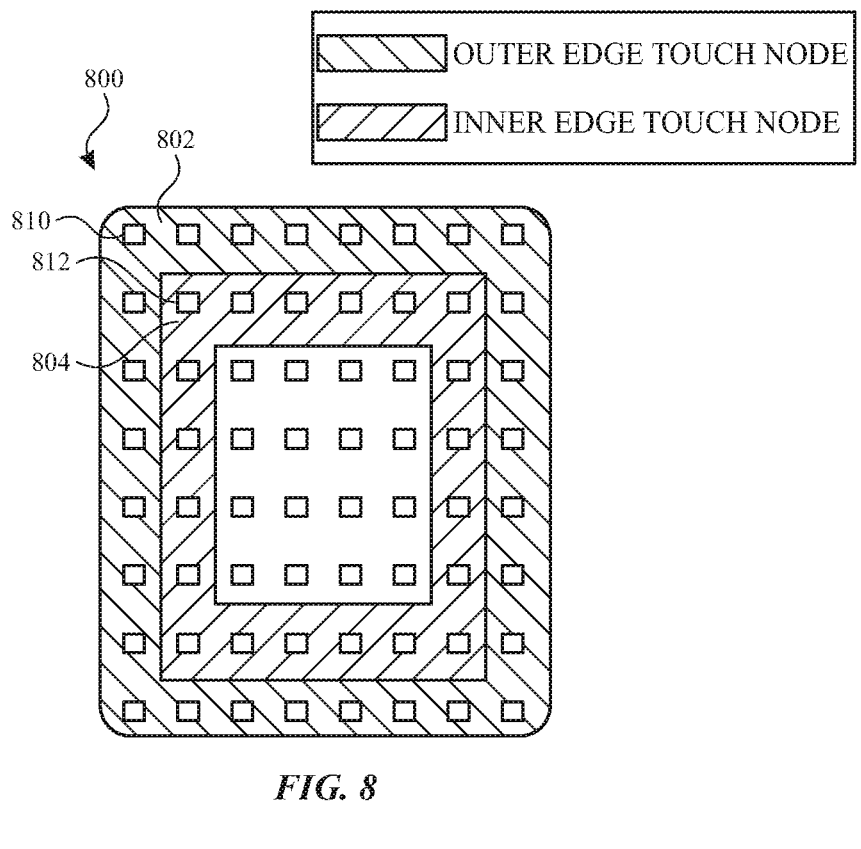
FIG. 8 illustrates an exemplary array of touch nodes including edge touch nodes corresponding to one or more edges of a touch-sensitive surface according to examples of the disclosure.

FIG. 8 illustrates an exemplary array of touch nodes including edge touch nodes corresponding to one or more edges of a touch-sensitive surface according to examples of the disclosure. The touch sensitive surface can include an array of touch nodes. For example, as illustrated in FIG. 8, the touch sensitive surface 800 can include an 8×8 array of touch nodes (including touch nodes 810 and 812). A touch image measured from touch sensitive surface 800 can have signal measurements for each touch node, which can be arranged in an 8×8 matrix of touch signals. For example, the touch image can be acquired using a guarded self-capacitance scan. The guarded scan can include driving non-sensed touch nodes in a given scan step of a multi-step self-capacitance scan with the same stimulation as sensed touch nodes or driving and sensing all touch nodes with the same stimulation where the whole touch sensor panel can be scanned in one step.

The number of qualifying outer edge touch nodes for a touch image can be determined by identifying outer edge touch nodes meeting one or more qualifying criteria. For example, the qualifying criteria can include a signal criterion that requires the touch signal be above a threshold. The qualifying criteria can also include an edge criterion that requires the touch nodes be outer edge touch nodes. As illustrated in FIG. 8, the outer edge touch nodes can be those touch nodes in region 802 that are within a threshold distance and immediately adjacent with the edge of the touch-sensitive surface 800 (e.g., including touch node 810, but excluding touch node 812). In some examples, the threshold distance can be such that additional touch nodes, not immediately adjacent to an edge, can be considered an outer edge touch node. The number of qualifying outer edge touch nodes can be determined for each touch image across multiple touch images, and a maximum number from among the touch images can be determined for the path.

The number of qualifying touch nodes for a touch image can be determined by identifying touch nodes (include edge touch nodes and non-edge touch nodes) meeting one or more qualifying criteria. For example, the qualifying criteria can include a signal criterion that requires the touch signal be above a threshold. In some examples, this threshold can be the same as the threshold for the signal criterion for qualifying outer edge touch nodes. In some examples, this threshold can be different than the threshold for the signal criterion for qualifying outer edge touch nodes. The signal criterion can be applied to the 64 touch nodes illustrated in FIG. 8. The number of qualifying touch nodes can be determined for each touch image across multiple touch images, and a maximum number from among the touch images can be determined for the path.

The maximum touch signal for a touch image can be determined by identifying a maximum touch signal value in the touch image. The maximum can be determined for each touch image across multiple touch images, and a maximum signal from among the touch images can be determined for the path.

The gradient of outer edge touch nodes and inner edge touch nodes for a touch image can be determined by summing the touch signal at each outer edge touch node in the touch image, summing the touch signal at each inner edge touch node, and taking the difference between these sums. As illustrated in FIG. 8, the outer edge touch nodes can be those touch nodes in region 802 that are within a first threshold distance and immediately adjacent with the edge of the touch-sensitive surface 800 (e.g., including touch node 810, but excluding touch node 812). The inner edge touch nodes can be those touch nodes in region 804 (e.g., including touch node 812) within a second threshold distance. The inner edge touch nodes can be immediately interior to the outer edge touch nodes in region 802. In some examples, the second threshold distance can be such that additional touch nodes, not immediately adjacent to an outer edge touch node, can be considered an inner edge touch node. The gradient of outer edge touch nodes and inner edge touch nodes can be determined for each touch image across multiple touch images, and a minimum gradient from among the touch images can be determined for the path.

At 730, the path can be classified based on the tracked touch image parameters (e.g., corresponding to at least a portion of the classification at 635). For example, at 735, the classification can including determining whether the maximum number of qualifying outer edge touch nodes for a path is less than a threshold number of qualifying outer edge touch nodes. When the maximum number of qualifying outer edge touch nodes for a path is greater than or equal to the threshold number of qualifying outer edge touch nodes, the path can be classified as a non-touch path corresponding to wet fabric and can be rejected (or the system can forgo further processing of the path) (740). When the maximum number of qualifying outer edge touch nodes for a path is less than the threshold number of qualifying outer edge touch nodes, the classification can include determining whether the minimum gradient for the path is less than a first gradient threshold at 745. When the minimum gradient for a path is greater than or equal to a first gradient threshold, the path can be classified as a non-touch path corresponding to wet fabric and can be rejected (or the system can forgo further processing of the path) (740). When the minimum gradient for a path is less than the first gradient threshold, the classification can include determining whether the minimum gradient for the path is less than a second gradient threshold (less than the first threshold) at 750. When the minimum gradient for a path is greater than or equal to the second gradient threshold, the classification can include determining whether the maximum number of qualifying touch nodes for a path is less than a first threshold number of qualifying touch nodes at 755. When the maximum number of qualifying touch nodes is greater than or equal to the first threshold number of qualifying touch nodes, the path can be classified as a non-touch path corresponding to wet fabric and can be rejected (or the system can forgo further processing of the path) (740). When the maximum number of qualifying touch nodes is less than the first threshold number of qualifying touch nodes, the path can be classified as a touch path for further processing (760). When the minimum gradient for a path is less than the second gradient threshold, the classification can include determining whether the maximum signal for the path is less than a signal threshold at 765. When the maximum signal is greater than or equal to the threshold signal, the path can be classified as a touch path for further processing (760). When the maximum signal is less than the threshold signal, the classification can include determining whether the maximum number of qualifying touch nodes is less than a second threshold number of qualifying touch nodes (greater than the first threshold number of qualifying touch nodes) (770). When the maximum number of qualifying touch nodes is greater than or equal to the second threshold number of qualifying touch nodes, the path can be classified as a non-touch path corresponding to wet fabric and can be rejected (or the system can forgo further processing of the path) (740). When the maximum number of qualifying touch nodes is less than the second threshold number of qualifying touch nodes, the path can be classified as a touch path for further processing (760).

In some examples, the classification at 730 can be performed when liftoff is detected for the path. In some examples, that classification at 730 can be performed prior to the detection of liftoff for a path (e.g., after the path is detected for a threshold period of time or a corresponding input patch of the path appears in a threshold number of consecutive touch images).

Although the output of classification at 730 is described as either classifying the path as a non-touch path corresponding to wet fabric that can be rejected (or the system can forgo further processing of the path) or classifying the path as a touch path for further processing, it should be understood, that in examples with multiple classifiers that the path may need to be classified as a touch path by each classifier to be processed as such, and that a classification by any of the classifiers as a non-touch path can result in rejecting (or forgoing further processing of) the path.

Additionally, it should be understood that process 700 is exemplary, and in some examples fewer, more or different processing is possible. For example, in some examples, rather than comparing the minimum gradient to two thresholds at 750 and 765, in some examples, the processing can instead determine whether the minimum gradient is less than the second threshold, between the first and second thresholds, or greater than or equal to the first threshold. In some examples, prior to the processing at 735, the maximum signal can be evaluated against a signal threshold (e.g., corresponding to the second threshold in FIG. 4) to identify paths corresponding to likely to intended contacts when the maximum signal is above the signal threshold.

Figure 9:
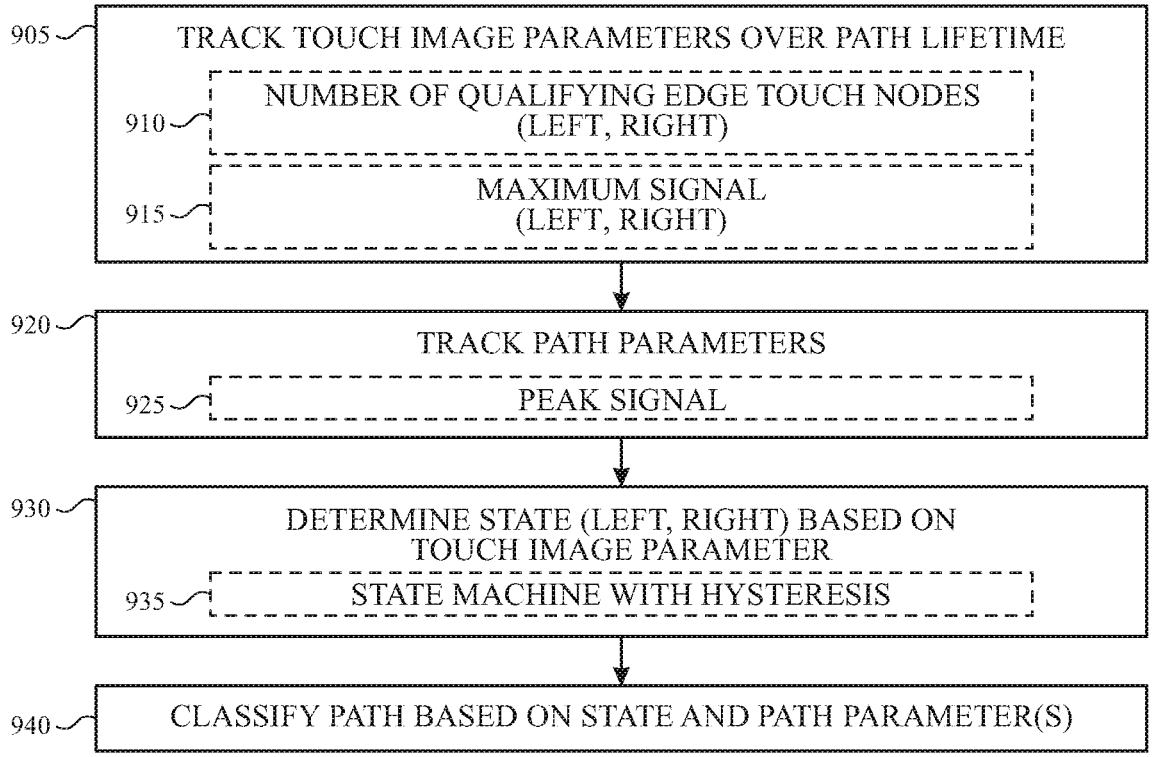
FIG. 9 illustrates an exemplary process for classifying paths based on based on a state according to examples of the disclosure.

As discussed above, classifying paths at 635 can include a second classifier that can be based on a tracked state. The state can be based on whether or not a qualifying edge condition is detected, and the qualifying edge condition can be based on touch image parameters. FIG. 9 illustrates an exemplary process 900 for classifying paths based on based on a state according to examples of the disclosure. At 905, touch image parameters can be determined for each touch image and/or tracked over a path lifetime (e.g., from an input patch corresponding to touch down and until lift off). The touch image parameters can include a number of qualifying edge touch nodes in a touch image (910) (or a region of the touch image) and a maximum signal in a touch image (915) (or in a region of the touch image).

Figure 10:
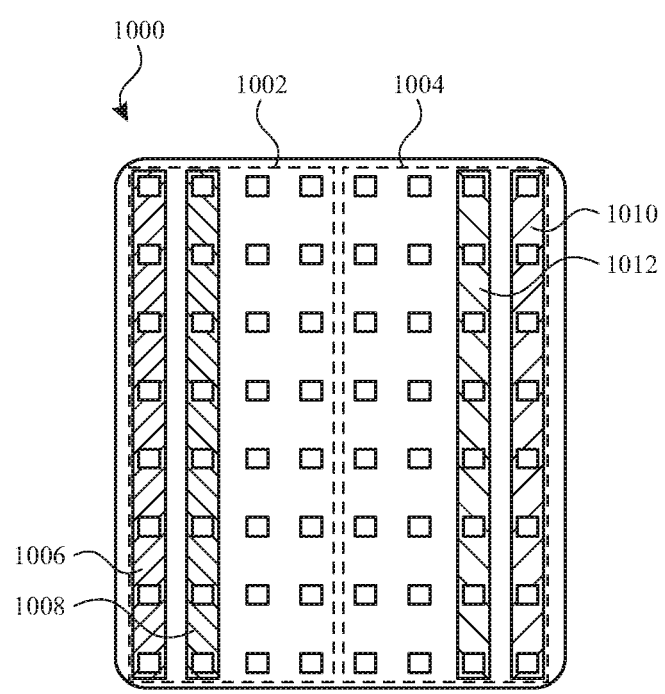
FIG. 10 illustrates an exemplary array of touch nodes including edge touch nodes corresponding to one or more edges of a touch-sensitive surface according to examples of the disclosure.

FIG. 10 illustrates an exemplary array of touch nodes including edge touch nodes corresponding to one or more edges of a touch-sensitive surface according to examples of the disclosure. The touch sensitive surface can include an array of touch nodes. For example, as illustrated in FIG. 10, the touch sensitive surface 1000 can include an 8×8 array of touch nodes. The array can be divided into two regions, 1002 and 1004, which can divide the array into a left-half and a right half. A touch image (e.g., acquired using a guarded self-capacitance scan) measured from touch sensitive surface 1000 can have signal measurements for each touch node, which can be arranged in an 8×8 matrix of touch signals.

The touch image parameters can be determined and/or tracked independently for each region of the array. For example, a maximum touch signal from among touch nodes in region 1002 can be determined and tracked across multiple touch images. Likewise, a maximum touch signal from among touch nodes in region 1004 can be determined and tracked across multiple touch images. In a similar manner, the number of qualifying touch nodes can be determined and/or tracked for each region. For example, as illustrated in FIG. 10, a number of qualifying touch nodes can be determined for column 1006 and a number of qualifying edge touch nodes can be determined for column 1008 for region 1002. Likewise, a number of qualifying edge touch nodes can be determined for column 1010 and a number of qualifying edge touch nodes can be determined for column 1012 for region 1004. The qualifying edge touch nodes can be touch nodes meeting one or more criteria. In such examples, touch nodes in columns 1006, 1008, 1010 and 1012 can be edge touch nodes within a threshold distance of a left edge or right edge, respectively, of the touch-sensitive surface 1000. In some examples, the criteria can include a first criterion that requires the touch signal for the touch nodes be greater than a first signal threshold. In some examples, the criteria can include a second criterion that requires the touch signal for the touch nodes be less than a second signal threshold. In some examples, the first threshold can correspond to the first threshold in FIG. 4 and the second threshold can correspond to the second threshold in FIG. 4. As described in more detail below, the state can be based on whether or not a qualifying edge condition is detected, and the qualifying edge condition can be based on the number of qualifying edge touch nodes and the maximum touch signal.

In addition to determining and/or tracking touch image parameters, at 920, path parameters can be tracked. For example, a peak signal can be tracked for each path. For example, for each input patch in a path, the peak touch signal can be determined from the touch nodes of the input patch. The path can track the peak signal across multiple input patches of the path and determine a maximum of the peak signals for input patches over the path lifetime as the peak signal for the path.

At 930, a state can be determined based on the touch image parameters. As with tracking touch image parameters, the state can be determined for different regions (e.g., regions 1002, 1004). In some examples, for each touch image, the touch image parameters can be used to detect a qualifying edge condition. In some examples, the qualifying edge condition can be determined for region 1002 when the number of qualifying touch nodes in column 1006 is greater than a threshold number or the number of qualifying touch nodes in column 1008 is greater than the threshold number, and the maximum touch signal for region 1002 is below a signal threshold. In some examples, the qualifying edge condition can be determined for region 1004 when the number of qualifying touch nodes in column 1010 is greater than a threshold number or the number of qualifying touch nodes in column 1012 is greater than the threshold number, and the maximum touch signal for region 1004 is below a signal threshold. The qualifying edge condition can indicate the second state. In some examples, the state determination can be implemented in a state machine including hysteresis (935), as described in more detail below with respect to FIG. 11. At 940, the paths can be classified based on the state and path parameters, as described in more detail below with respect to FIG. 12.

Figure 11:
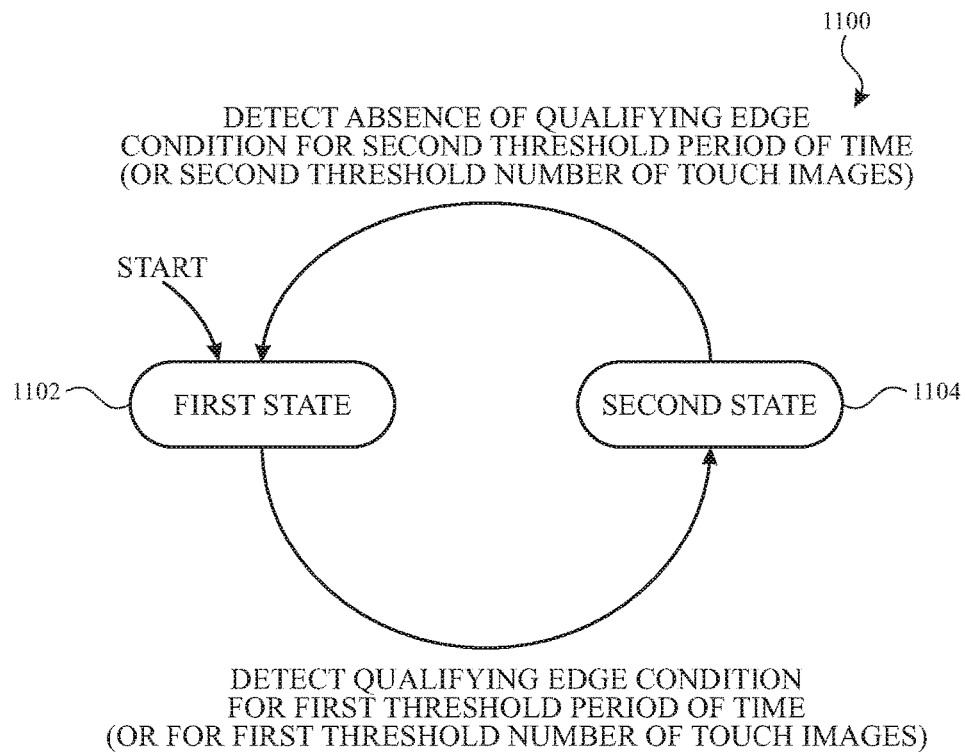
FIG. 11 illustrates an exemplary state machine tracking a state of the device according to examples of the disclosure.

FIG. 11 illustrates an exemplary state machine 1100 tracking a state of the device according to examples of the disclosure. For example, the state of the device can be a first state 1102 not indicative of a wet material at an edge of the touch-sensitive device and a second state 1104 indicative of a wet material at an edge of the touch-sensitive device. The state machine can begin operation in the first state 1102 (e.g., when the device or touch-sensitive surface is powered on). In some examples, the state of the device can be determined to be the first state 1102 when a qualifying edge condition is not detected in a touch image, and the state of the device can be determined to be the second state 1104 when the qualifying edge condition is detected in the touch image. In some examples, to avoid high frequency switching between these states for different touch images, hysteresis can be applied in the state determination. For example, transition from the first state 1102 to the second state 1104 can occur when the qualifying edge condition is detected for a first threshold period of time or for a first threshold number of touch images. Transition from the second state 1104 to the first state 1102 can occur when the qualifying edge condition is not detected for a second threshold period of time or for a second threshold number of touch images. In some examples, the first threshold period of time (or the first threshold number of touch images) and the second threshold period of time (or the second threshold number of touch images) can be the same. In some examples, the first threshold period of time (or the first threshold number of touch images) and the second threshold period of time (or the second threshold number of touch images) can be different. For example, the second threshold period of time (or the second threshold number of touch images) can be longer (or greater) than the first threshold period of time (or the first threshold number of touch images).

Figure 12:
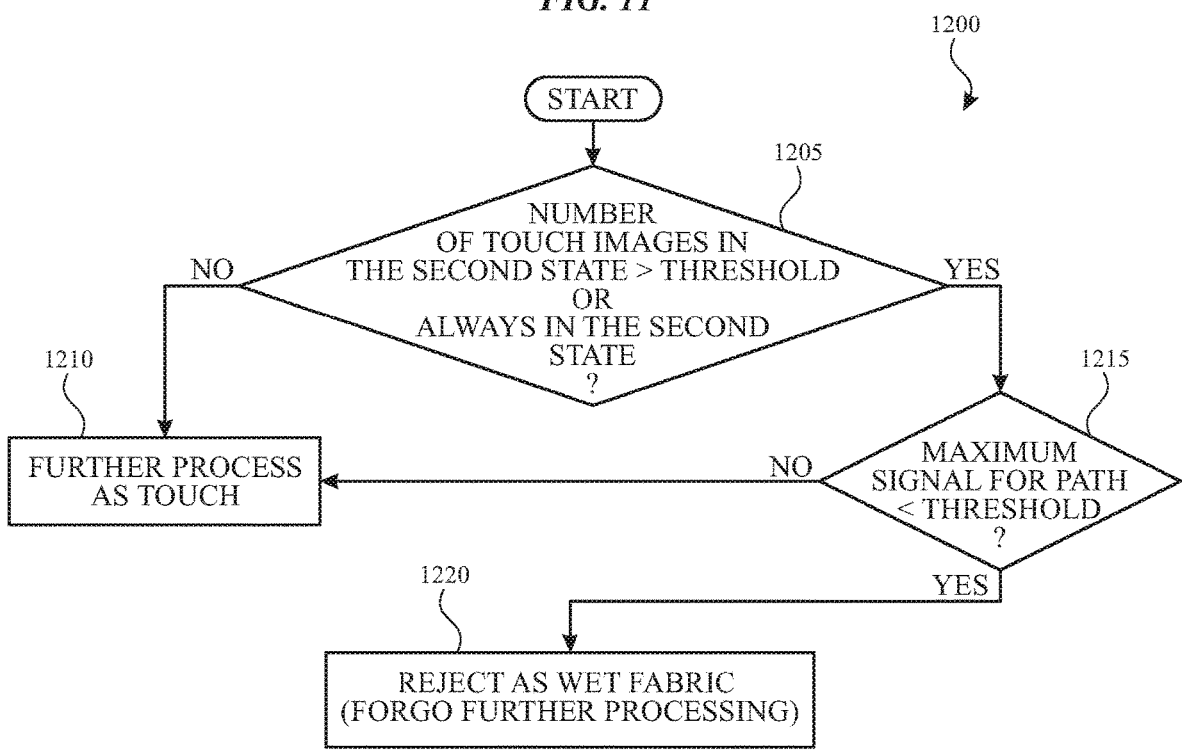
FIG. 12 illustrates an exemplary process for classifying a path based on the tracked state according to examples of the disclosure.

FIG. 12 illustrates an exemplary process 1200 for classifying a path based on the tracked state (e.g., corresponding to 940 in process 900) according to examples of the disclosure. For example, over the lifetime of a path, a number of frames in the second state can be tracked. Each frame can correspond to a duration of time for the system during which time the display can be refreshed and at least one touch sensing scan can be performed. In some examples, the frame can be a 60 Hz frame (16.67 ms). In some examples, the frame can be greater or less (e.g., 30 Hz frame, 120 Hz frame). For example, at 1205, the classification can include determining whether the number of frames for a path in a second state is greater than a threshold number or whether all frames for a path are in the second state. When the number of frames for a path in a second state is greater than a threshold number or when all frames for a path are in the second state, the path can be classified as a touch path for further processing (1210). When the number of frames for a path in a second state is less than or equal to the threshold number and when at least one frame for a path is in the first state, the processing can further include determining, at

1215, whether the maximum signal for the path is less than a signal threshold. When the maximum signal for the path is greater than or equal to the signal threshold, the path can be classified as a touch path for further processing (1210). When the maximum signal for the path is less than the signal threshold, the path can be classified as a non-touch path corresponding to wet fabric and can be rejected (or the system can forgo further processing of the path) (1220).

In some examples, the classification at 1200 can be performed when liftoff is detected for the path. In some examples, that classification at 1200 can be performed prior to the detection of liftoff of a path (e.g., after the path is detected for a threshold period of time or appears in a threshold number of consecutive touch images or frames).

Although the output of classification at 1200 is described as either classifying the path as a non-touch path corresponding to wet fabric that can be rejected (or the system can forgo further processing of the path) or classifying the path as a touch path for further processing, it should be understood, that in examples with multiple classifiers that the path may need to be classified as a touch path by each classifier to be processed as such, and that a classification by any of the classifiers as a non-touch path can result in rejecting (or forgoing further processing of) the path.

Figure 13A:
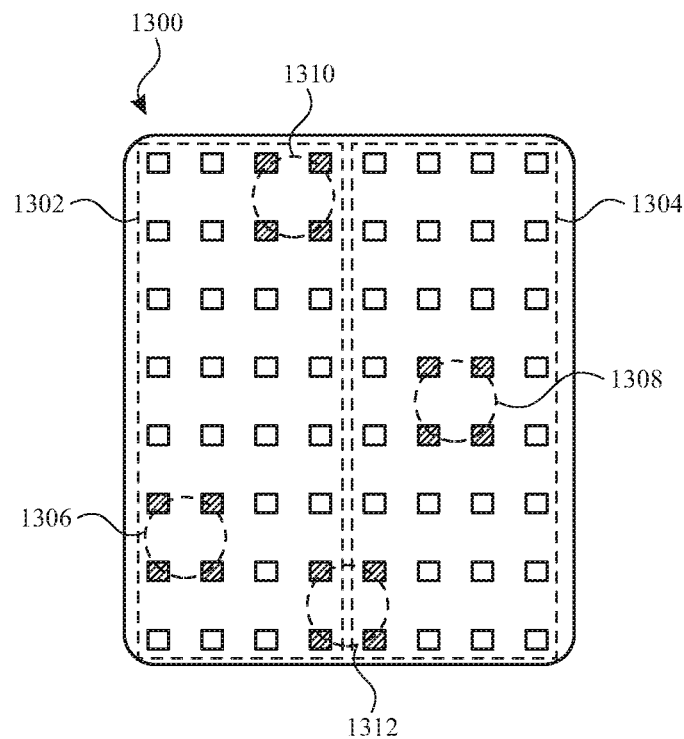
FIGS. 13A-13B illustrates exemplary paths detected on an exemplary touch sensitive surface including multiple regions according to examples of the disclosure.

The classification of process 1200 can be performed on a path by path basis and can evaluate parameters tracked for a corresponding region. As illustrated in FIG. 10, in some examples, the first and second regions can refer to a left half and a right half of the touch sensor panel. Paths in the first region can be classified based on the state and parameters of the first region. Paths in the second region can be classified based on the state and parameters of the second region. For example, FIG. 13A illustrates exemplary paths detected on an exemplary touch sensitive surface including multiple regions according to examples of the disclosure. Touch sensitive surface 1300 can correspond to touch sensitive surface 1000 and can include regions 1302 and 1304 corresponding to regions 1002 and 1004. FIG. 13A illustrates exemplary paths 1306, 1308, 1310 and 1312. Paths 1306 and 1310 in region 1302 can be classified based on the state and parameters corresponding to region 1302. Path 1308 in region 1304 can be classified based on the state and parameters corresponding to region 1304. Path 1312 can overlap both regions 1302 and 1304. In some examples, path 1312 can be evaluated based the state and parameters corresponding to the region in which the centroid of an input patch of path 1312 is located (e.g., centroid at touch down, centroid at liftoff, average centroid, etc.). In some examples, a path overlapping the two regions, such as path 1312, can be classified as a touch path (not corresponding to a wet material) without requiring classification according to process 1200. In some examples, path 1312 can be classified using state and parameters of both regions.

Figure 13B:
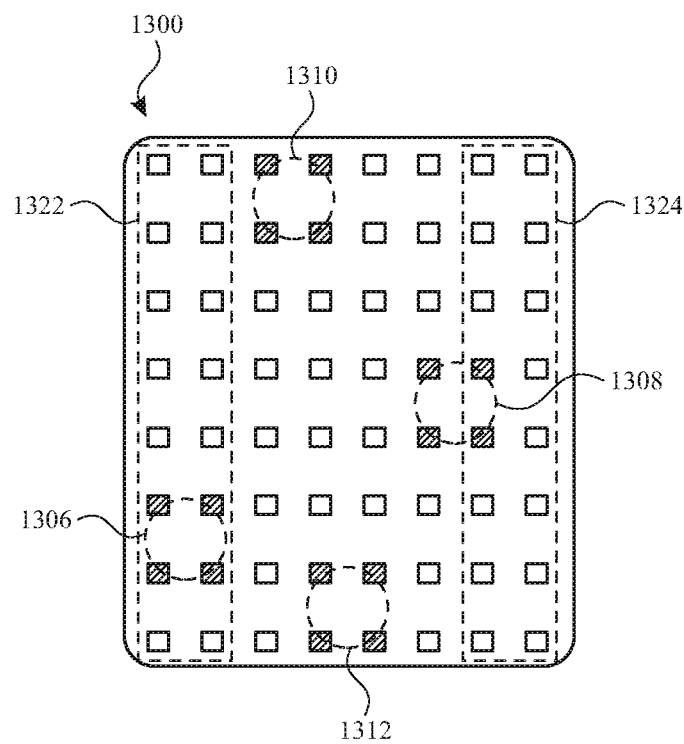

Although FIG. 13A illustrates classifying paths within two regions dividing the touch-sensitive surface in half, in some examples, the classification of paths can be limited to different, smaller regions. Shrinking the regions can reduce the number of false positive classifications of non-touch paths when touch input was intended. FIG. 13B illustrates exemplary paths detected on an exemplary touch sensitive surface including multiple regions according to examples of the disclosure. Unlike in FIG. 13A, in FIG. 13B, paths in regions 1322 and 1324 (smaller than regions 1302 and 1304) can be classified based on state and touch parameters of regions 1302 and 1304, respectively. Paths 1306 in region 1322 can be classified based on the state and parameters corresponding to region 1302. Path 1308 in or overlapping region 1324 can be classified based on the state and parameters corresponding to region 1304. Paths 1310 and 1312 outside regions 1322 and 1324 may be classified as a touch path (not corresponding to a wet material) without requiring classification according to process 1200. Although FIG. 13B illustrates regions 1322 and 1324 as each covering a quarter of the touch nodes of the touch sensor panel, it should be understood that the regions can be greater or lesser. For example, in some examples the regions 1322 and 1324 can be defined as a threshold distance from the corresponding edge (left or right). For example, the distance can be 10% of the distance across the touch sensor panel (or 25% or 40%) for the corresponding edge.

Therefore, according to the above, some examples of the disclosure are directed to an electronic device. The electronic device can comprise a touch-sensitive surface and one or more processors coupled to the touch-sensitive surface. The one or more processors can be programmed to: identify a path in touch images, the path comprising one or more input patches corresponding to an object touching or proximate to the touch-sensitive surface; determine touch image parameters for the touch images corresponding to the path, the touch image parameters including a number of qualifying edge touch nodes; and classify the path as a touch path or a non-touch path based on the determined touch image parameters. In accordance with classifying the path as a touch path, the one or more processors can be programmed to process the path as touch input, and in accordance with classifying the path as a non-touch path, the one or more processors can be programmed to forgo processing the path as touch input. Additionally or alternatively to one or more of the examples disclosed above, in some examples, the touch image parameters corresponding to the path can include a maximum number of qualifying edge touch nodes, a maximum number of qualifying touch nodes, a maximum touch signal, or a minimum gradient. Additionally or alternatively to one or more of the examples disclosed above, in some examples, the path can be classified as a non-touch path when: (1) the maximum number of qualifying edge touch nodes is greater than or equal to a threshold number of qualifying edge touch nodes; (2) the minimum gradient is greater than or equal to a first gradient threshold; (3) the minimum gradient is less the first gradient threshold, but greater than a second gradient threshold, and the maximum number of qualifying touch nodes is greater than or equal to a first threshold number of qualifying touch nodes; or (4) the minimum gradient is less the second gradient threshold, the maximum touch signal is less than a threshold signal, and the maximum number of qualifying touch nodes is greater than or equal to second threshold number of qualifying touch nodes. Additionally or alternatively to one or more of the examples disclosed above, in some examples, classifying the path can occur upon liftoff of the object corresponding to the path. Additionally or alternatively to one or more of the examples disclosed above, in some examples, classifying the path can occur once the path includes a threshold number of input patches. Additionally or alternatively to one or more of the examples disclosed above, in some examples, the one or more processors can be further programmed to determine a state from a first state and a second state based on touch image parameters. Classifying the path based on the determined touch image parameters can comprise classifying the path based on the state. Additionally or alternatively to one or more of the examples disclosed above, in some examples, determining the state can comprise: transitioning from the first state to the second state when a qualifying edge condition is detected is detected for a first threshold period of time; and transitioning from the second state to the first state when the qualifying edge condition is not detected is detected for a second threshold period of time. Additionally or alternatively to one or more of the examples disclosed above, in some examples, determining the state can comprise: determining a respective state for a first region of the touch-sensitive surface based on the touch image parameters for the first region of the touch-sensitive surface and a respective state of a second region of the touch-sensitive surface based on the touch image parameters for the second region of the touch-sensitive surface. Additionally or alternatively to one or more of the examples disclosed above, in some examples, classifying the path based on the state can comprise: in accordance with the path being located in the first region of the touch-sensitive surface, classifying the path based on the respective state for the first region of the touch-sensitive surface; and in accordance with the path being located in the second region of the touch-sensitive surface, classifying the path based on the respective state for the second region of the touch-sensitive surface. Additionally or alternatively to one or more of the examples disclosed above, in some examples, classifying the path based on the state can comprise: in accordance with the path being located in the first region of the touch-sensitive surface and within a threshold distance of an first edge of the touch-sensitive surface, classifying the path based on the respective state for the first region of the touch-sensitive surface; in accordance with the path being located in the second region of the touch-sensitive surface and within the threshold distance of a second edge of the touch-sensitive surface opposite the first edge, classifying the path based on the respective state for the second region of the touch-sensitive surface; and in accordance with the path being located in the first region of the touch-sensitive surface outside the threshold distance of the first edge or in the second region of the touch-sensitive surface outside the threshold distance of the second edge, classifying the path as the touch path.

Some examples of the disclosure are directed to a method. The method can comprise: identifying a path in touch images, the path comprising one or more input patches corresponding to an object touching or proximate to a touch-sensitive surface; determining touch image parameters for the touch images corresponding to the path, the touch image parameters including a number of qualifying edge touch nodes; and classifying the path as a touch path or a non-touch path based on the determined touch image parameters. In accordance with classifying the path as a touch path, the method can comprise processing the path as touch input, and in accordance with classifying the path as a non-touch path, the method can comprise forgoing processing the path as touch input. Additionally or alternatively to one or more of the examples disclosed above, in some examples, the touch image parameters corresponding to the path can include a maximum number of qualifying edge touch nodes, a maximum number of qualifying touch nodes, a maximum touch signal, or a minimum gradient. Additionally or alternatively to one or more of the examples disclosed above, in some examples, the path can be classified as a non-touch path when: (1) the maximum number of qualifying edge touch nodes is greater than or equal to a threshold number of qualifying edge touch nodes; (2) the minimum gradient is greater than or equal to a first gradient threshold; (3) the minimum gradient is less the first gradient threshold, but greater than a second gradient threshold, and the maximum number of qualifying touch nodes is greater than or equal to a first threshold number of qualifying touch nodes; or (4) the minimum gradient is less the second gradient threshold, the maximum touch signal is less than a threshold signal, and the maximum number of qualifying touch nodes is greater than or equal to second threshold number of qualifying touch nodes. Additionally or alternatively to one or more of the examples disclosed above, in some examples, classifying the path can occur upon liftoff of the object corresponding to the path. Additionally or alternatively to one or more of the examples disclosed above, in some examples, classifying the path can occur once the path includes a threshold number of input patches. Additionally or alternatively to one or more of the examples disclosed above, in some examples, the method can further comprise determining a state from a first state and a second state based on touch image parameters. Classifying the path based on the determined touch image parameters can comprise classifying the path based on the state. Additionally or alternatively to one or more of the examples disclosed above, in some examples, determining the state can comprise: transitioning from the first state to the second state when a qualifying edge condition is detected is detected for a first threshold period of time; and transitioning from the second state to the first state when the qualifying edge condition is not detected is detected for a second threshold period of time. Additionally or alternatively to one or more of the examples disclosed above, in some examples, determining the state can comprise: determining a respective state for a first region of the touch-sensitive surface based on the touch image parameters for the first region of the touch-sensitive surface and a respective state of a second region of the touch-sensitive surface based on the touch image parameters for the second region of the touch-sensitive surface. Additionally or alternatively to one or more of the examples disclosed above, in some examples, classifying the path based on the state can comprise: in accordance with the path being located in the first region of the touch-sensitive surface, classifying the path based on the respective state for the first region of the touch-sensitive surface; and in accordance with the path being located in the second region of the touch-sensitive surface, classifying the path based on the respective state for the second region of the touch-sensitive surface. Additionally or alternatively to one or more of the examples disclosed above, in some examples, classifying the path based on the state can comprise: in accordance with the path being located in the first region of the touch-sensitive surface and within a threshold distance of an first edge of the touch-sensitive surface, classifying the path based on the respective state for the first region of the touch-sensitive surface; in accordance with the path being located in the second region of the touch-sensitive surface and within the threshold distance of a second edge of the touch-sensitive surface opposite the first edge, classifying the path based on the respective state for the second region of the touch-sensitive surface; and in accordance with the path being located in the first region of the touch-sensitive surface outside the threshold distance of the first edge or in the second region of the touch-sensitive surface outside the threshold distance of the second edge, classifying the path as the touch path. Some examples of the disclosure are directed to a non-transitory computer readable storage medium. The non-transitory computer readable storage medium can store instructions, which when executed by an electronic device comprising a touch screen, an array of coils and one or more processors, can cause the one or more processors to perform any of the above methods.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. An electronic device comprising:
a touch-sensitive surface; and
one or more processors coupled to the touch-sensitive surface programmed to:
   identify a path in touch images, the path comprising one or more input patches corresponding to an object touching or proximate to the touch-sensitive surface;
   determine touch image parameters for the touch images corresponding to the path, the touch image parameters including a number of qualifying edge touch nodes, wherein the qualifying edge touch nodes are within a threshold distance from an edge of the touch-sensitive surface;
   classify the path as a touch path or a non-touch path based on the determined touch image parameters;
   in accordance with classifying the path as a touch path, process the path as touch input; and
   in accordance with classifying the path as a non-touch path, forgo processing the path as touch input.

2. The electronic device of claim 1, wherein the touch image parameters corresponding to the path include a maximum number of qualifying edge touch nodes, a maximum number of qualifying touch nodes, a maximum touch signal, or a minimum gradient.

3. The electronic device of claim 2, wherein the path is classified as a non-touch path when:
(1) the maximum number of qualifying edge touch nodes is greater than or equal to a threshold number of qualifying edge touch nodes;
(2) the minimum gradient is greater than or equal to a first gradient threshold;
(3) the minimum gradient is less the first gradient threshold, but greater than a second gradient threshold, and the maximum number of qualifying touch nodes is greater than or equal to a first threshold number of qualifying touch nodes; or
(4) the minimum gradient is less the second gradient threshold, the maximum touch signal is less than a threshold signal, and the maximum number of qualifying touch nodes is greater than or equal to second threshold number of qualifying touch nodes.

4. The electronic device of claim 1, wherein classifying the path occurs upon liftoff of the object corresponding to the path.

5. The electronic device of claim 1, wherein classifying the path occurs once the path includes a threshold number of input patches.

6. The electronic device of claim 1, wherein one or more processors are further programmed to:
determine a state from a first state and a second state based on touch image parameters;
wherein classifying the path based on the determined touch image parameters comprises classifying the path based on the state.

7. The electronic device of claim 6, wherein determining the state comprises:
transitioning from the first state to the second state when a qualifying edge condition is detected for a first threshold period of time; and
transitioning from the second state to the first state when the qualifying edge condition is not detected for a second threshold period of time.

8. The electronic device of claim 6, wherein determining the state comprises:
determining a respective state for a first region of the touch-sensitive surface based on the touch image parameters for the first region of the touch-sensitive surface and a respective state of a second region of the touch-sensitive surface based on the touch image parameters for the second region of the touch-sensitive surface.

9. The electronic device of claim 8, wherein classifying the path based on the state comprises:
in accordance with the path being located in the first region of the touch-sensitive surface, classifying the path based on the respective state for the first region of the touch-sensitive surface; and
in accordance with the path being located in the second region of the touch-sensitive surface, classifying the path based on the respective state for the second region of the touch-sensitive surface.

10. The electronic device of claim 8, wherein classifying the path based on the state comprises:
in accordance with the path being located in the first region of the touch-sensitive surface and within a threshold distance of a first edge of the touch-sensitive surface, classifying the path based on the respective state for the first region of the touch-sensitive surface;
in accordance with the path being located in the second region of the touch-sensitive surface and within the threshold distance of a second edge of the touch-sensitive surface opposite the first edge, classifying the path based on the respective state for the second region of the touch-sensitive surface; and
in accordance with the path being located in the first region of the touch-sensitive surface outside the threshold distance of the first edge or in the second region of the touch-sensitive surface outside the threshold distance of the second edge, classifying the path as the touch path.

11. A method comprising:
identifying a path in touch images, the path comprising one or more input patches corresponding to an object touching or proximate to a touch-sensitive surface;
determining touch image parameters for the touch images corresponding to the path, the touch image parameters including a number of qualifying edge touch nodes, wherein the qualifying edge touch nodes are within a threshold distance from an edge of the touch-sensitive surface;
classifying the path as a touch path or a non-touch path based on the determined touch image parameters;
in accordance with classifying the path as a touch path, processing the path as touch input; and
in accordance with classifying the path as a non-touch path, forgoing processing the path as touch input.

12. The method of claim 11, wherein the touch image parameters corresponding to the path include a maximum number of qualifying edge touch nodes, a maximum number of qualifying touch nodes, a maximum touch signal, or a minimum gradient.

13. The method of claim 12, wherein the path is classified as a non-touch path when:
(1) the maximum number of qualifying edge touch nodes is greater than or equal to a threshold number of qualifying edge touch nodes;
(2) the minimum gradient is greater than or equal to a first gradient threshold;

(3) the minimum gradient is less the first gradient threshold, but greater than a second gradient threshold, and the maximum number of qualifying touch nodes is greater than or equal to a first threshold number of qualifying touch nodes; or (4) the minimum gradient is less the second gradient threshold, the maximum touch signal is less than a threshold signal, and the maximum number of qualifying touch nodes is greater than or equal to second threshold number of qualifying touch nodes.

14. The method of claim 11, wherein classifying the path occurs upon liftoff of the object corresponding to the path.

15. The method of claim 11, wherein classifying the path occurs once the path includes a threshold number of input patches.

16. The method of claim 11, the method further comprising:
determining a state from a first state and a second state based on touch image parameters;
wherein classifying the path based on the determined touch image parameters comprises classifying the path based on the state.

17. The method of claim 16, wherein determining the state comprises:
transitioning from the first state to the second state when a qualifying edge condition is detected for a first threshold period of time; and
transitioning from the second state to the first state when the qualifying edge condition is not detected for a second threshold period of time.

18. The method of claim 16, wherein determining the state comprises:
determining a respective state for a first region of the touch-sensitive surface based on the touch image parameters for the first region of the touch-sensitive surface and a respective state of a second region of the touch-sensitive surface based on the touch image parameters for the second region of the touch-sensitive surface.

19. The method of claim 18, wherein classifying the path based on the state comprises:
in accordance with the path being located in the first region of the touch-sensitive surface, classifying the path based on the respective state for the first region of the touch-sensitive surface; and
in accordance with the path being located in the second region of the touch-sensitive surface, classifying the path based on the respective state for the second region of the touch-sensitive surface.

20. The method of claim 18, wherein classifying the path based on the state comprises:
in accordance with the path being located in the first region of the touch-sensitive surface and within a threshold distance of a first edge of the touch-sensitive surface, classifying the path based on the respective state for the first region of the touch-sensitive surface;
in accordance with the path being located in the second region of the touch-sensitive surface and within the threshold distance of a second edge of the touch-sensitive surface opposite the first edge, classifying the path based on the respective state for the second region of the touch-sensitive surface; and
in accordance with the path being located in the first region of the touch-sensitive surface outside the threshold distance of the first edge or in the second region of the touch-sensitive surface outside the threshold distance of the second edge, classifying the path as the touch path.

21. A non-transitory computer readable storage medium storing instructions, which when executed by one or more processors, cause the one or more processors to perform a method, the method comprising:
identifying a path in touch images, the path comprising one or more input patches corresponding to an object touching or proximate to a touch-sensitive surface;
determining touch image parameters for the touch images corresponding to the path, the touch image parameters including a number of qualifying edge touch nodes, wherein the qualifying edge touch nodes are within a threshold distance from an edge of the touch-sensitive surface;
classifying the path as a touch path or a non-touch path based on the determined touch image parameters;
in accordance with classifying the path as a touch path, processing the path as touch input; and
in accordance with classifying the path as a non-touch path, forgoing processing the path as touch input.

22. The method of claim 21, wherein the touch image parameters corresponding to the path include a maximum number of qualifying edge touch nodes, a maximum number of qualifying touch nodes, a maximum touch signal, or a minimum gradient.

23. The non-transitory computer readable storage medium of claim 22,
wherein the path is classified as a non-touch path when:
(1) the maximum number of qualifying edge touch nodes is greater than or equal to a threshold number of qualifying edge touch nodes;
(2) the minimum gradient is greater than or equal to a first gradient threshold;
(3) the minimum gradient is less the first gradient threshold, but greater than a second gradient threshold, and the maximum number of qualifying touch nodes is greater than or equal to a first threshold number of qualifying touch nodes; or
(4) the minimum gradient is less the second gradient threshold, the maximum touch signal is less than a threshold signal, and the maximum number of qualifying touch nodes is greater than or equal to second threshold number of qualifying touch nodes.

24. The non-transitory computer readable storage medium of claim 21, wherein classifying the path occurs upon liftoff of the object corresponding to the path.

25. The non-transitory computer readable storage medium of claim 21, wherein classifying the path occurs once the path includes a threshold number of input patches.

* * * * *